US012633124B2

(12) United States Patent
King et al.

(10) Patent No.: US 12,633,124 B2
(45) Date of Patent: May 19, 2026

(54) VIRTUAL ASSISTANT BASED CARGO INSPECTION

(71) Applicant: MOTOROLA SOLUTIONS, INC., Chicago, IL (US)

(72) Inventors: Melanie A. King, Wesley Chapel, FL (US); Scott A. Greven, Lehigh Acres, FL (US); Lisajane M. Romer, Delray Beach, FL (US); Max N. Rosenfeld, Oakland Park, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 111 days.

(21) Appl. No.: 18/460,241

(22) Filed: Sep. 1, 2023

(65) Prior Publication Data

US 2025/0078515 A1 Mar. 6, 2025

(51) Int. Cl.
*G06V 20/54* (2022.01)
*H04N 7/18* (2006.01)

(52) U.S. Cl.
CPC ............. *G06V 20/54* (2022.01); *H04N 7/185* (2013.01)

(58) Field of Classification Search
None
See application file for complete search history.

(56) References Cited

U.S. PATENT DOCUMENTS

| | | | | |
|---|---|---|---|---|
| 2018/0157932 | A1* | 6/2018 | Gu | ......................... G06N 20/00 |
| 2021/0019910 | A1 | 1/2021 | Huyn et al. | |
| 2022/0101112 | A1* | 3/2022 | Brown | .................... G10L 15/18 |

(Continued)

FOREIGN PATENT DOCUMENTS

| | | |
|---|---|---|
| CN | 1930494 A | 3/2007 |
| CN | 111709619 A | 9/2020 |
| CN | 112184093 A | 1/2021 |

(Continued)

OTHER PUBLICATIONS

Naumann et al., "Literature Review: Computer Vision Applications in Transportation Logistics and Warehousing," 2023, arXiv preprint arXiv:2304.06009, 44 pages.

*Primary Examiner* — Samuel D Fereja

(74) *Attorney, Agent, or Firm* — Michael Best & Friedrich LLP

(57) ABSTRACT

Systems and methods for virtual assistant based cargo inspection. The method includes automatically inspecting a subset of cargo using a first recorded video associated with the cargo and generating a second recorded video by annotating the first recorded video including annotations for a second subset of the cargo identified for manual inspection. The method also includes accessing, using a portable communications device, a virtual assistant feature of the portable communications device. In response to receiving one or more prompts via the virtual assistant feature, the method includes receiving the second recorded video and generating an interactive display for displaying the second recorded video. In response to receiving one or more prompts via the virtual assistant feature, the method also includes detecting an interaction with the annotations of the second recorded video and providing, using the virtual assistant feature, a recommendation corresponding to the interaction via a human machine interface.

20 Claims, 6 Drawing Sheets

(56) References Cited

U.S. PATENT DOCUMENTS

| | | | |
|---|---|---|---|
| 2022/0174361 A1* | 6/2022 | Dorn | H04N 21/4725 |
| 2023/0281786 A1* | 9/2023 | Sauer | G01V 5/20 |
| | | | 382/103 |

FOREIGN PATENT DOCUMENTS

| | | | |
|---|---|---|---|
| CN | 114140044 A | 3/2022 | |
| CN | 115311603 A | 11/2022 | |
| CN | 115730878 A | 3/2023 | |
| JP | 2017509903 A | 4/2017 | |
| WO | 03073228 A2 | 9/2003 | |
| WO | 2005091743 A2 | 10/2005 | |

* cited by examiner

100

140

110

Communication Network 120 120 120 130 130 130

110

Server

210 Electronic Processor

250

230 Transceiver

Memory 220

Input/Output Interface 240

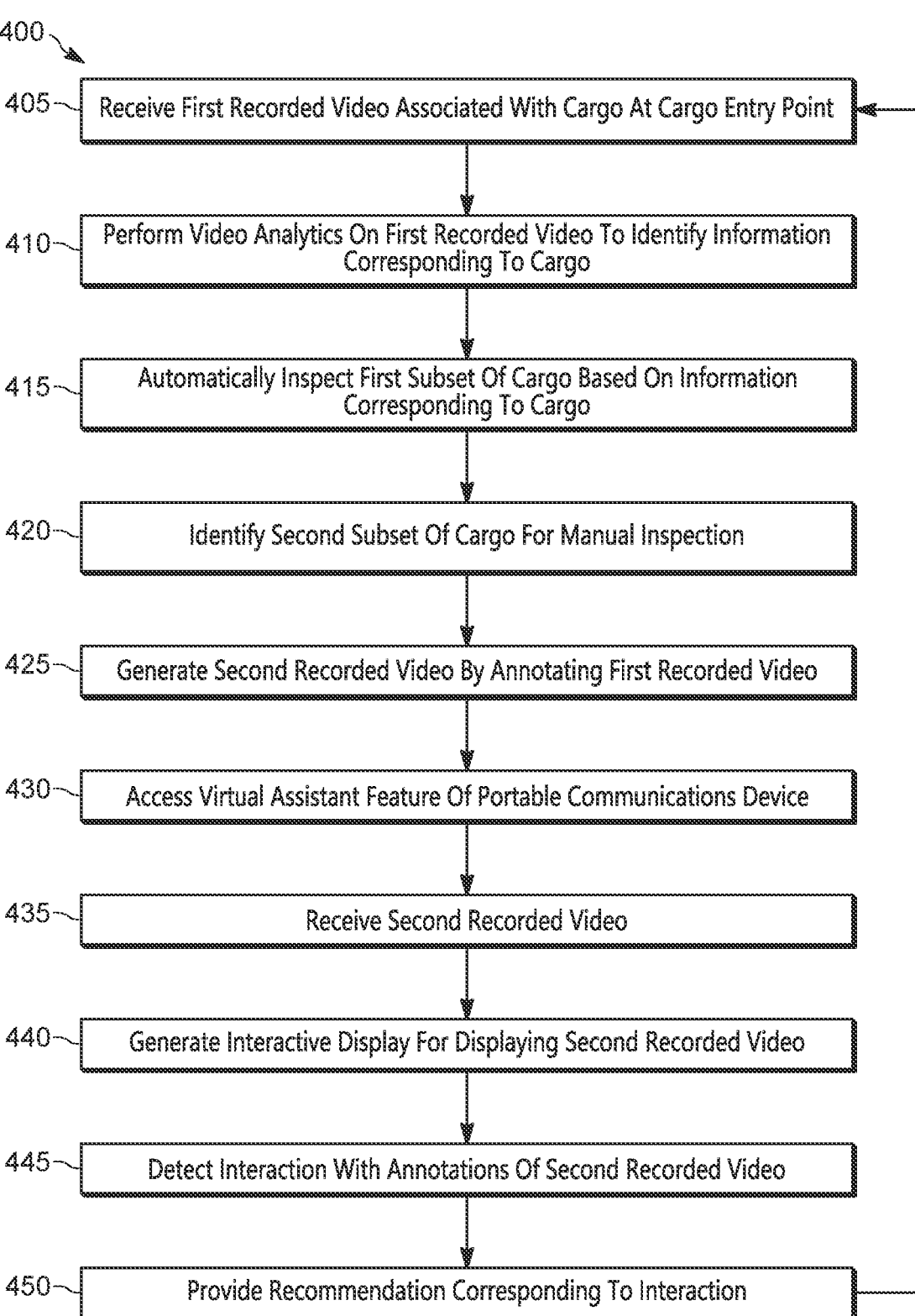

400

405 — Receive First Recorded Video Associated With Cargo At Cargo Entry Point

410 — Perform Video Analytics On First Recorded Video To Identify Information Corresponding To Cargo 415 — Automatically Inspect First Subset Of Cargo Based On Information Corresponding To Cargo 420 — Identify Second Subset Of Cargo For Manual Inspection 425 — Generate Second Recorded Video By Annotating First Recorded Video 430 — Access Virtual Assistant Feature Of Portable Communications Device 435 — Receive Second Recorded Video 440 — Generate Interactive Display For Displaying Second Recorded Video 445 — Detect Interaction With Annotations Of Second Recorded Video 450 — Provide Recommendation Corresponding To Interaction

FIG. 4

Color And Shape

Battery

Engine

Controller Board ID

Tires ID

VIN ID

520

510

Radiator ID

Wheel

520

VIRTUAL ASSISTANT BASED CARGO INSPECTION

BACKGROUND OF THE INVENTION

Containers of cargo flow between international borders and entry points to facilitate international trade. Cargo is inspected by Customs and Border Protection (CBP) personnel before entry into the United States. Cargo may be inspected for products that are not approved for US market, products that include dangerous or banned chemicals, counterfeit products or products that otherwise infringe on intellectual property rights of others, and the like.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments, examples, aspects, and features that include the claimed subject matter, and explain various principles and advantages of aspects of those embodiments, examples, aspects, and features.

FIG. 4 is a flowchart of a method for cargo inspection in accordance with some examples.

Figure 1:
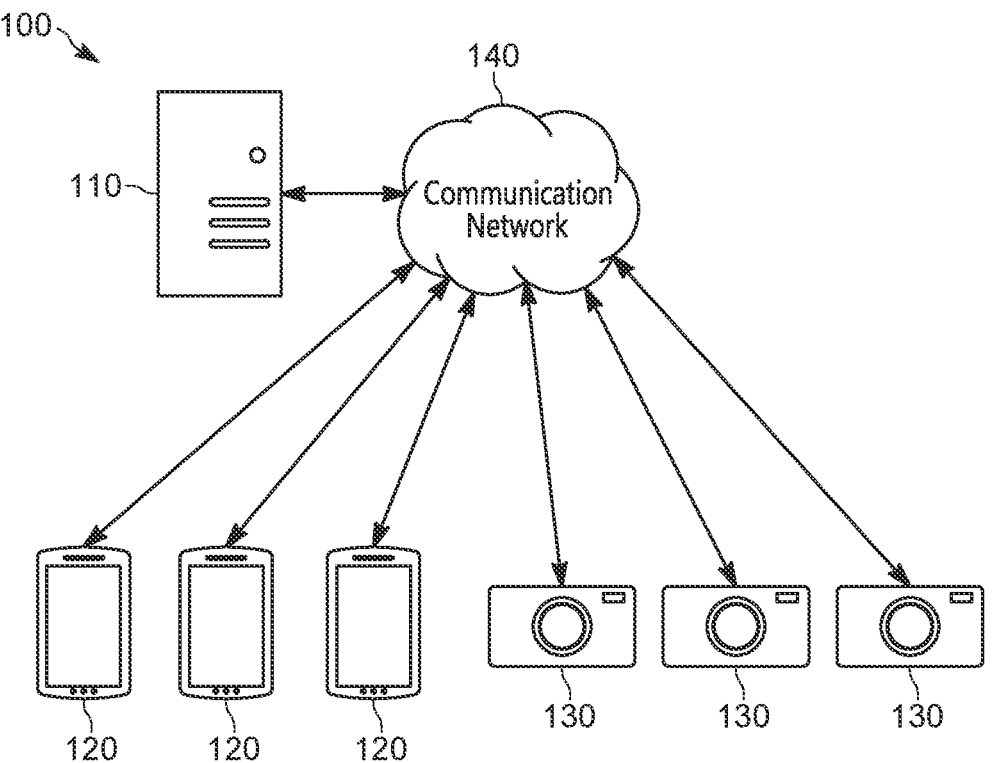
FIG. 1 is a block diagram of a communication system for cargo inspection in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of examples disclosed herein.

The apparatus and method components have been represented where appropriate by conventional symbols in the drawings, showing only those specific details that are pertinent to understanding the embodiments, examples, aspects, and features so as not to obscure the disclosure with details that will be readily apparent to those of ordinary skill in the art having the benefit of the description herein.

It should be understood that although certain figures presented herein illustrate hardware and software located within particular devices, these depictions are for illustrative purposes only. In some examples, the illustrated components may be combined or divided into separate software, firmware, and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

DETAILED DESCRIPTION OF THE INVENTION

Products arriving at the entry point may vary by type and origin. Each shipment of product includes documentation denoting the type, origin, destination, and other details relating to the product. Detecting irregularities in products is becoming increasingly difficult due to the number of different products that pass through an entry point. Expertise in a particular type of product, origin of the product, type of ingredients of the product, and the like may be needed to properly inspect the product. Additionally, the documentation of the product may be provided in various languages depending on the origin of the product. However, CBP entry points do not have sufficient personnel with expertise in each of these areas and/or languages to properly conduct an inspection.

Each product may involve different steps in an inspection. CBP personnel may need to understand which portion of the product to look for, what to look for, and how the product corresponds to the documentation provided for the product. For example, a car is inspected by checking the vehicle identification number (VIN), the location of the VIN on the car, the physical features of the car, and the like, whereas a food item is inspected by performing a chemical test. The variance involved in the steps for inspection of different products may lead to errors in inspection. Additionally, inspection of the product may be time consuming depending on the number of steps involved in an inspection and the volume of incoming product.

An organization shipping products may quickly direct the products to a different regional entry point, if the product was previously stopped at a first regional entry point. The different entry points may not track trends in products, which may result in contraband product escaping without detection at the new regional entry points.

Accordingly, there is a need for improved methods and systems for conducting CBP inspections.

One example provides a method for cargo inspection including receiving, at a server electronic processor, first recorded video associated with cargo at a cargo entry point and performing, using the server electronic processor, video analytics on the first recorded video to identify information corresponding to the cargo. The method also includes automatically inspecting, using the server electronic processor, a first subset of the cargo based on the information corresponding to the cargo and identifying, using the server electronic processor, a second subset of the cargo for manual inspection based on the information corresponding to the cargo. The method further includes generating, using the server electronic processor, a second recorded video by annotating the first recorded video. The second recorded video includes annotations for the second subset of the cargo. The method also includes accessing, using a portable communications device communicatively coupled to the server electronic processor, a virtual assistant feature of the portable communications device. In response to receiving one or more prompts via the virtual assistant feature, the method includes receiving, using the portable communications device, the second recorded video from the server electronic processor and generating, using a device electronic processor of the portable communications device, an interactive display for displaying the second recorded video. In response to receiving one or more prompts via the virtual assistant feature, the method also includes detecting, using the device electronic processor, an interaction with the annotations of the second recorded video and providing, using the virtual assistant feature, a recommendation corresponding to the interaction via a human machine interface.

Another example provides a communication system for cargo inspection including a server and a portable communications device communicatively coupled to the server. The server includes an electronic processor configured to receive a first recorded video associated with cargo at a cargo entry point and perform video analytics on the first recorded video to identify information corresponding to the cargo. The electronic processor is also configured to automatically inspect a first subset of the cargo based on the information corresponding to the cargo, identify a second subset of the cargo for manual inspection based on the information corresponding to the cargo, and generate a second recorded video by annotating the first recorded video. The second recorded video includes annotations for the second subset of the cargo. The portable communications device includes a device electronic processor configured to access a virtual assistant feature of the portable communications device, and in response to receiving one or more prompts via the virtual assistant feature the device electronic processor is configured to receive the second recorded video from the server and generate an interactive display for displaying the second recorded video. In response to receiving one or more prompts via the virtual assistant feature the device electronic processor is also configured to detect an interaction with the annotations of the second recorded video, and provide, using the virtual assistant feature, a recommendation corresponding to the interaction via a human machine interface.

With reference to FIG. 1, a communication system 100 for cargo inspection includes a server 110, a plurality of portable communications devices 120, and a plurality of image capture devices 130. The server 110 communications with the plurality of portable communications device 120 and the plurality of image capture devices 130 over a communication network 140. The communication system 100 may include more or fewer components than those illustrated in FIG. 1 and may perform additional functions other than those described herein.

The server 110 is a computing device implemented in a cloud infrastructure or located at a customs and border protection (CBP) facility or other location. The portable communications devices 120 are, for example, portable two-way radios, mobile two-way radios, smart telephones, smart wearable devices, and the like. In some examples, each portable communications device 120 may be assigned to an inspecting CBP officer (for example, personnel). The image capture devices 130 are, for example, closed circuit television cameras (CCTV), body-worn cameras, and the like. In some examples, the image capture devices 130 are integrated into the portable communications device 120, for example, a smart telephone including a camera. In other examples, the image capture devices 130 are connected to the portable communications devices 120 and communicate with the server 110 using the portable communications devices 120. The communication network 140 is, for example, a Wi-Fi® network, a cellular network, the Internet, or the like, or a combination of one or more wired networks and/or one or more wireless networks.

In some examples, the communication system 100 is implemented at a CBP regional entry point (for example, first regional entry point) such that the server 110 may communication with servers 110 of other CBP regional entry points (for example, second regional entry point) over the communication network 140. In some examples, the various servers 110 across the various CBP regional entry points may be implemented over a cloud computing infrastructure and may function as a single server 110 that serves the various CBP regional entry points.

Figure 2:
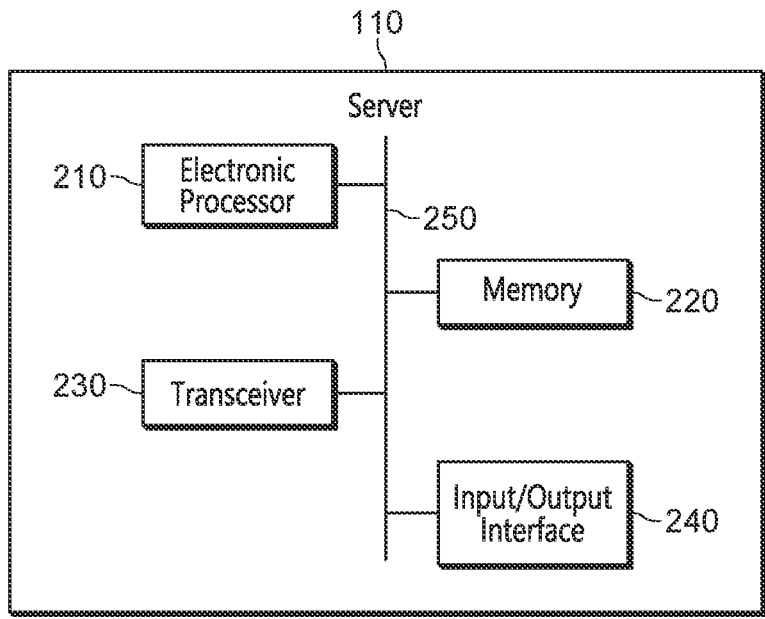
FIG. 2 is a block diagram of a server of the communication system of FIG. 1 in accordance with some examples.

FIG. 2 is a block diagram of one example of the server 110. In the example illustrated, the server 110 includes an electronic processor 210 (for example, server electronic processor), a memory 220, a transceiver 230, and an input/output interface 240. The electronic processor 210, the memory 220, the transceiver 230, and the input/output interface 240 communicate over one or more control and/or data buses (for example, a communication bus 250). FIG. 2 illustrates only one example of the server 110. The server 110 may include more or fewer components and may perform functions other than those explicitly described herein.

In some examples, the electronic processor 210 is implemented as a microprocessor with separate memory, such as the memory 220. In other examples, the electronic processor 210 may be implemented as a microcontroller (with memory 220 on the same chip). In other examples, the electronic processor 210 may be implemented using multiple processors. In addition, the electronic processor 210 may be implemented partially or entirely as, for example, a field-programmable gate array (FPGA), an applications specific integrated circuit (ASIC), an x86 processor, and the like and the memory 220 may not be needed or be modified accordingly. In the example illustrated, the memory 220 includes non-transitory, computer-readable memory that stores instructions that are received and executed by the electronic processor 210 to carry out the functionality of the server 110 described herein. The memory 220 may include, for example, a program storage area and a data storage area. The program storage area and the data storage area may include combinations of different types of memory, such as read-only memory and random-access memory. In some examples, the server 110 may include on electronic processor 210, and/or a plurality of electronic processors 210 in a cloud computer cluster arrangement, one or more of which may be executing none, all, or a portion of the applications or instructions of the server 110 provided below, sequentially or in parallel across the one or more electronic processors 210. The one or more electronic processors 210 comprising the server 110 may be geographically co-located or may be separated (for example, by miles), and interconnected via electronic and/or optical interconnects. One or more proxy servers or load balancing servers may control which one or more electronic processors 210 perform any, part, or all of the applications provided below.

The transceiver 230 enables wired and/or wireless communication of the server 110 with the plurality of portable communications devices 120 and the plurality of image capture devices 130 over the communication network 140. In some examples, the transceiver 230 may comprise separate transmitting and receiving components. The input/output interface 240 may include one or more input mechanisms (for example, a touch pad, a keypad, a microphone, and the like), one or more output mechanisms (for example, a display, a speaker, and the like), or a combination thereof, or a combined input and output mechanism such as a touch screen.

In the example illustrated in FIG. 2, a single device is illustrated as including all the components and the applications of the server 110. However, it should be understood that one or more of the components and one or more of the applications may be combined or divided into separate software, firmware, and/or hardware. Regardless of how they are combined or divided, these components and application may be executed on the same computing device or may be distributed among different computing devices connected by one or more networks or other suitable communication means. In one example, all the components and applications of the server 110 are implemented in a cloud infrastructure accessible through several terminal devices, with the processing power located at a server location.

Figure 3:
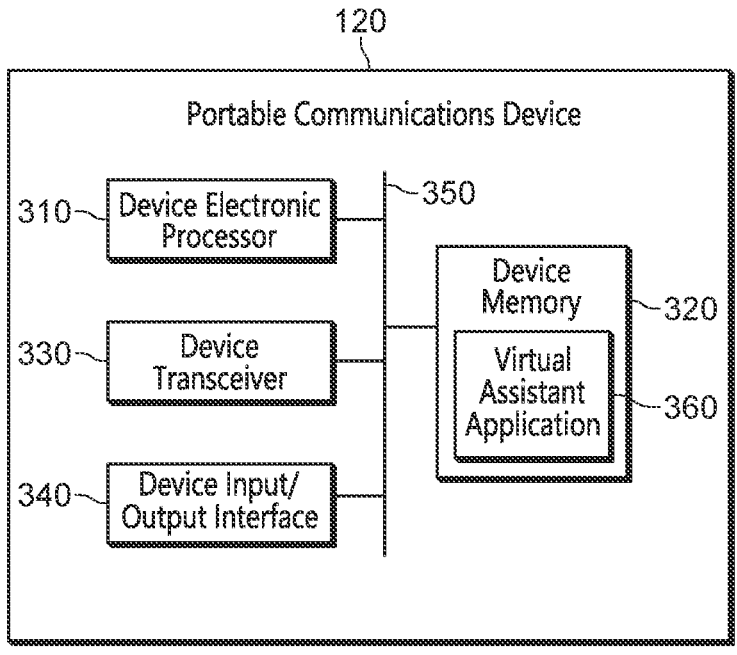
FIG. 3 is a block diagram of a portable communications device of the communications system of FIG. 1 in accordance with some examples.

FIG. 3 is a block diagram of one example of the portable communications device 120. In the example illustrated, the portable communications device 120 includes a device electronic processor 310, a device memory 320, a device transceiver 330, and a device input/output interface 340. The device electronic processor 310, the device memory 320, the device transceiver 330, and the device input/output interface 340 communicate over one or more control and/or data buses (for example, a device communication bus 350). FIG. 3 illustrates only one example of the portable communications device 120. The portable communications device 120 may include more or fewer components and may perform functions other than those explicitly described herein.

The device electronic processor 310, the device memory 320, the device transceiver 330, and the device input/output interface 340 may be implemented similar to the electronic processor 210, the memory 220, the transceiver 230, and the input/output interface 240. In the example illustrated, the device memory 320 includes a virtual assistant application 360. The virtual assistant application 360 provides a virtual assistant feature on the portable communications device 120. The virtual assistant feature can receive voice, gesture, and/or text prompts from a user of the portable communications device 120 and perform actions or provide responses accordingly. In some examples, the virtual assistant feature performs natural language processing to decipher a command/request from a prompt and provides, for example, a pre-programmed function or response to the prompt as further detailed below. In some examples, the virtual assistant feature may include a partial or full machine learning capability such that the functions and/or responses may be trained and deployed during the use of the virtual assistant feature.

International trade includes goods being transported between an origin country where the goods are manufactured or assembled and a destination country where the goods are consumed. Goods are transported as cargo on ships, aircrafts, railways, or motor vehicles. Before entering the destination country, the goods may be held at an entry point (for example, port, airport, border crossing) for inspection by customs and border protection. At the CBP entry point, inspection may be performed on all cargo, flagged cargo, or randomly selected cargo. Flagged cargo may include cargo that is selected based on an apparent or observed discrepancy relating to the cargo.

FIG. 4 illustrates a flowchart of an example method 400 for cargo inspection. In the example illustrated in FIG. 4, the method 400 includes receiving, at the electronic processor 210, a first recorded video associated with cargo at a cargo entry point (at block 405). The cargo entry point is, for example, a CBP entry point. During a cargo inspection, an image capture device 130 is used to capture the first recorded video associated with the cargo. The first recorded video may include, for example, images and/or video of the paper documentation associated with the cargo (for example, shipping label, air waybill, invoice, or the like), images and/or video of the container including the cargo, and/or images and/or video of the goods included in the cargo. In some examples, the paper documentation associated with the cargo may be directly attached to the cargo container and may be captured together with the cargo container in the first recorded video. In some examples, the first recorded video may include electronic copies (for example, in portable document format (PDF)) of the paper documentation. The first recorded video is a recorded video which has concluded recording before being received by the electronic processor 210. That is, the first recorded video is not a non-stop or live streamed video. In one example, the first recorded video is captured using a smart telephone, a portable two-way radio, body camera, or the like (for example, a portable communications device 120) assigned to a CBP Officer (for example, personnel). In some examples, the first recorded video is captured using a closed circuit television (CCTV) camera, a camera mounted to an automated or semi-automated vehicle (e.g., a robot camera, a drone camera, or the like), a security camera, or the like. The first recorded video may also include infrared, X-ray, or other types of non-visible spectrum images or videos. The image capture device 130 sends the first recorded video to the server 110 over the communication network 140. In some examples, the image capture device 130 automatically captures and/or uploads (that is, sends) the first recorded video immediately after capture without any request from the server 110. In some examples, the image capture device 130 captures and/or uploads the first recorded video based on a request from the server 110, for example, based on a user request to inspect the cargo. The image capture device 130 may be controlled by the server 110 or may be remotely operated by a user, for example, using the server 110 to capture the first recorded video.

Figure 5:
FIG. 5 illustrates an example recorded video analyzed by the communication system of FIG. 1 in accordance with some examples.

The method 400 includes performing, using the electronic processor 210, video analytics on the first recorded video to identify information corresponding to the cargo (at block 410). In some examples, performing video analytics includes performing optical character recognition (OCR) on paper documentation associated with the cargo to determine the text on the paper documentation. This text is then analyzed to determine information relating to the cargo. Information relating to the cargo include, for example, origin, destination, entities associated with the cargo (for example, manufacturer, assembler, importer, exporter, distributer, or the like), type of goods, quantity of goods, identification information relating to the goods or components of the goods, or the like. In some examples, performing video analytics include performing optical character recognition on text provided directly on the cargo or the goods of the cargo. Performing video analytics may also include using known image processing techniques to identify the color, shape, texture, density, size, volume, layout, and/or the like of the object within the first recorded video. Information corresponding to the cargo includes information discernible from the first recorded video and that is useful for performing an inspection on the cargo. FIG. 5 illustrates one example of performing video analytics on a first recorded video. In the example illustrated in FIG. 5, the cargo includes a passenger car 510. An image capture device 130 captures the first recorded video of the passenger car 510 and provides the first recorded video of the passenger car 510 to the server 110. The electronic processor 210 performs video analytics on the first recorded video to determine, for example, vehicle dimensions, vehicle color and shape, vehicle brand and model, tire type and model, tire serial number, and/or the like.

The method 400 includes automatically inspecting, using the electronic processor 210, a first subset of the cargo based on the information corresponding to the cargo (at block 415). Automatically inspecting includes inspecting without user input or intervention. The electronic processor 210 may inspect the cargo by comparing the information corresponding to the cargo deciphered from the first recorded video to expected information or consistency with other information related to the cargo. In some examples, the electronic processor 210 automatically inspects items or parts that are visually available (for example, labels, dimensions, colors, and the like). In the example of FIG. 5, the electronic processor 210 may inspect whether the color and shape of the passenger car 510 match an expected color and shape of the brand of the passenger car 510. Other examples of inspection includes determining whether the serial numbers match the serial numbers assigned to the manufacturer, whether the components are consistent with the components expected to be found on the product, whether the information on the paper documentation matches the physical characteristics of the product, and/or the like. In some situations, the first recorded video may not capture all of the features of the product. Referring to the example of FIG. 5, the first recorded video may not capture, the vehicle identification number, the battery, the engine, the radiator, and the like as these features are physically present behind other features. The automatic inspection may therefore be carried out on only a first subset (for example, visible features) of the cargo. In some examples, cargo may include a plurality of products and inspecting the first subset includes inspecting a subset of the plurality of products of the cargo.

The method 400 includes identifying, using the electronic processor 210, a second subset of the cargo for manual inspection (at block 420). The electronic processor 210 may determine that at least a portion of the cargo cannot be automatically inspected based on the first recorded video. The electronic processor 210 identifies this portion (that is, the second subset) of the cargo for manual inspection by a CBP Officer. In some examples, the electronic processor 210 may generate a checklist of inspection items for each cargo. This checklist may be generated based on the type of cargo being inspected. The electronic processor 210 may automatically inspect the cargo based on the checklist. The automatic inspection may be limited by the information visible in the first recorded video. A portion of the checklist may not be automatically inspected based on the first recorded video. The electronic processor 210 may identify the second subset of cargo for manual inspect based on the remaining items on the checklist.

In one example, the second subset of the cargo is identifier based on a risk assessment of the cargo. The electronic processor 210 performs a risk assessment of the cargo based on the information corresponding to the cargo. The risk assessment is performed based on applying risk factors to the information corresponding to the cargo. The risk facts can include, for example, cargo type, cargo documentation accuracy, source of cargo, historical data relating to cargo, agent experience, agent expertise, and location of entry point. The electronic processor 210 assigns a risk score for the cargo based on the risk assessment. The second subset may be identified based on the risk score of the cargo. In one example, cargo from certain origin may carry additional risk of including contraband (e.g., illicit drugs, banned chemicals, or the like). When cargo from this origin are received, the electronic processor 210 may assign a higher risk score compared to cargo from other origins. In some examples, historical inspection feedback corresponding to the information (for example, origin, destination, type, and/or the like) corresponding to the cargo as described below.

Figure 6A:
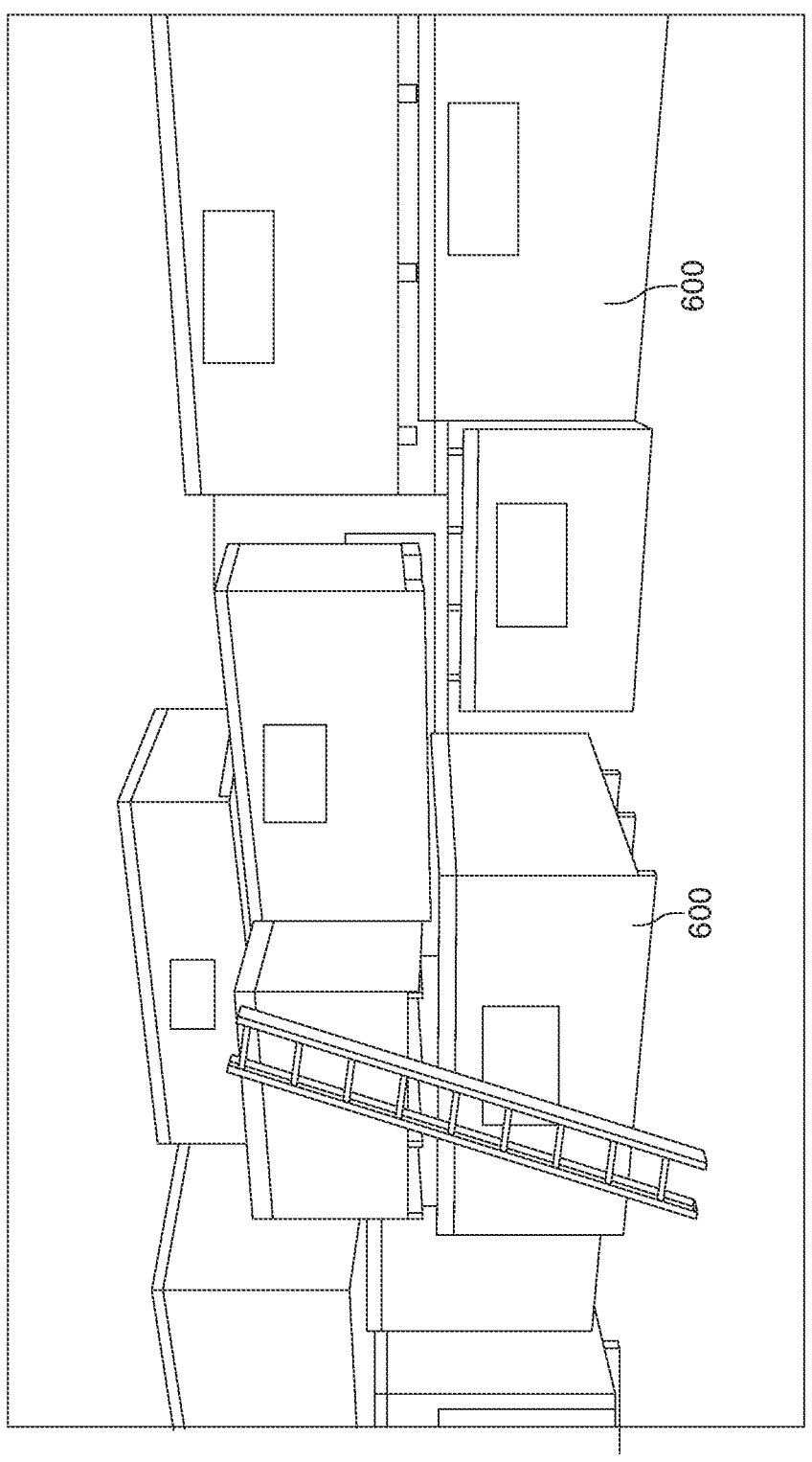
FIGS. 6A and 6B illustrate an example recorded video analyzed by the communication system of FIG. 1 in accordance with some examples.
Figure 6B:
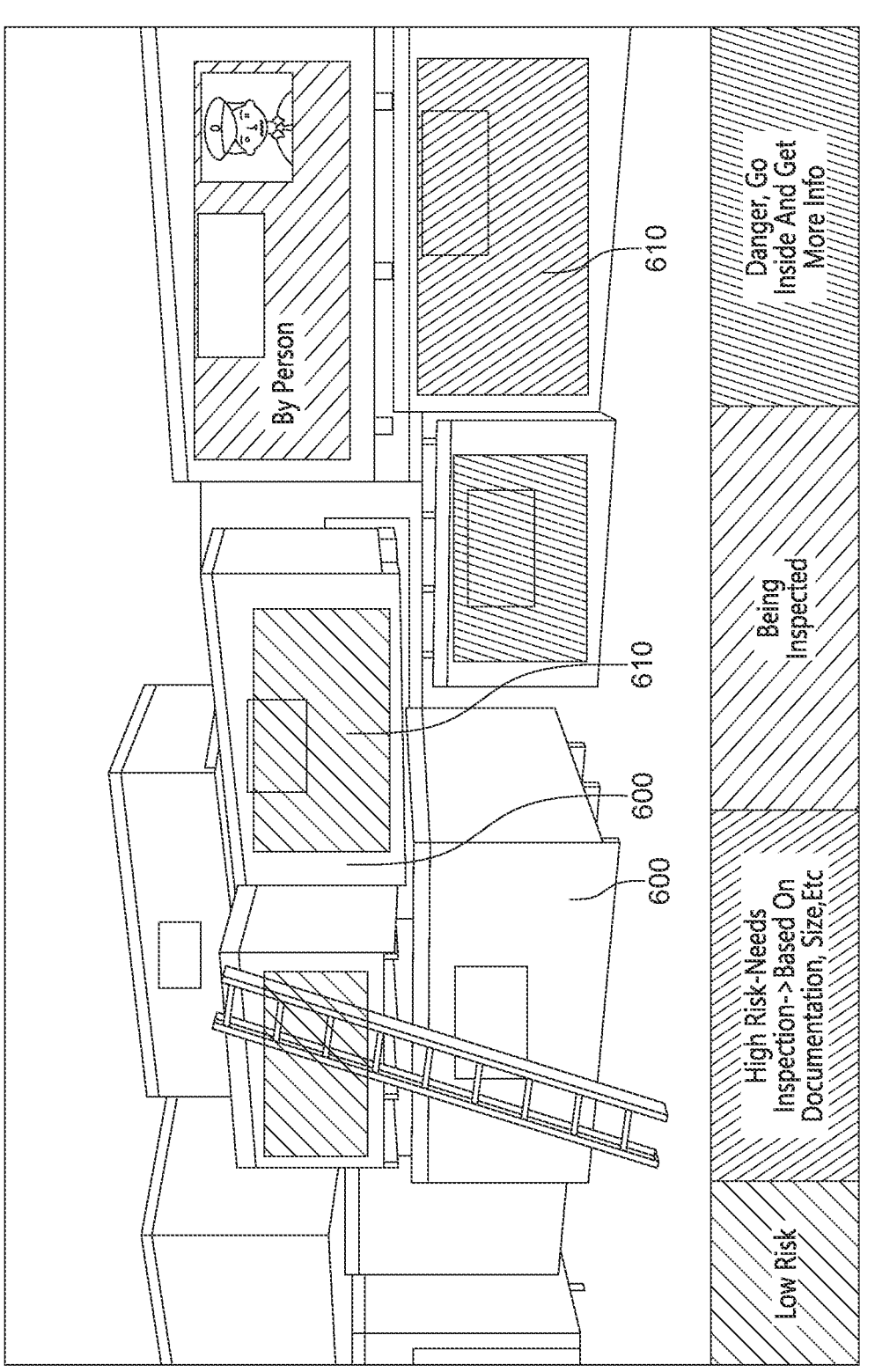

The method 400 includes generating, using the electronic processor 210, a second recorded video by annotating the first recorded video (at block 425). The second recorded video includes annotations for the second subset of the cargo. The electronic processor 210 annotates the first video based on the video analytics. For example, the electronic processor 210 provides first indications on the video on the portions of the cargo that have already been inspected either automatically or manually. The first indications may include a first colored indication (for example, a green highlight, green circle, or the like) to indicate that the inspection has been complete and no further action is needed for that indicated portion of the cargo. The electronic processor 210 may also provide second indications on the video on the portion of the cargo that need to be manually inspected. The second indications may include a second colored indication (for example, an orange highlight, an orange circle, or the like) to indicate that the portion of the cargo is to be manually inspected. The electronic processor 210 may also provide third indication on the video on the portion of the cargo that is suspected to have failed inspection. The third indications may include a third colored indications (for example, a red highlight, a red circle, or the like) to indicate that the portion of the cargo is suspected to have failed inspection. In some examples, portions of cargo suspected to have failed inspection and portions of the cargo that are to be manually inspected may be provided with similar indications. The annotations may also be in the form of textual comments, textual indications, or the like in addition to or in place of other indications. In some examples, the annotations are interactive such that the annotations may be selected (for example, clicking, touching on a touch screen, or the like) by a user. In the example illustrated in FIG. 5, annotations 520 are provided in relation to the cargo. The annotations include first annotations shown in a first color to highlight the portions that have been automatically inspected by the electronic processor 210 and second annotations shown in a second color to highlight the portions that are to be manually inspected. FIG. 6A (for example, first recorded video) and FIG. 6B (for example, second recorded video) also illustrate how a recorded video may be highlighted based on automatic inspection of cargo 600 and providing instructions for additional inspection by a CBP Officer. The second recorded video as shown in FIG. 6B may include annotations 610 to assist the CBP Officer with manual inspection. In the example of FIG. 6B, the second recorded video may be displayed on a display screen (for example, television monitor) located at the inspection site. The second recorded video may include image/video data and audio data similar to the first recorded video. In addition, the second recorded video may include metadata related to the annotations.

In some examples, the annotations may suggest the order in which cargo should be inspected. The order may be determined based on prioritization (for example, based on amount of time cargo has been in port, whether cargo has perishable items, or the like), identifying high-risk cargo (for example, based on chemicals, source of cargo, or the like), labels and documentation with discrepancies, latest counterfeit trends, number of resources and tasks allocated to CBP Officers, and cross-correlation of high-risk cargo across different inspection locations (as further discussed below). In one example, the annotations may also include translations of documents or labels.

The method 400 includes accessing, using the portable communications device 120 communicatively coupled to the server 110, a virtual assistant feature of the portable communications device 120 (at block 430). Virtual assistant features may include platforms similar to Alexa, Siri, Cortana, ChatGPT, or the like that may provide an interactive computer-based assistant that responds to user commands. The virtual assistant feature may be built directly into the operating system of the portable communications device 120 (for example, Siri) or may be accessed using an application (for example, chatGPT) of the portable communications device 120. The virtual assistant feature may be accessed by using an introductory text or voice prompt (for example, "Hey KITT" or the like). In some examples, the virtual assistant feature may run in the background such that an introductory text or voice prompt may not be needed and the virtual assistant feature can be accessed simply by any prompt as described below. The virtual assistant feature receives prompts from the user and provides responses relating to the prompts. For example, in response to questions relating to the cargo, the virtual assistant feature, as executed by the device electronic processor 310, retrieves the relevant information and displays the information or announces the information. Example questions may include, "what is the origin of the cargo?", "what are the banned chemicals most commonly found in this type of cargo?", "show me an image of an authentic product for this type of cargo," and/or the like. The virtual assistant feature may refer to a database, for example, a central database for CBP storing information from various regional entry-points, to obtain or compose answers to the questions. In some examples, the virtual assistant feature uses large language models (that is, machine learning models) to obtain or compose intelligible and accurate answers to the questions. The virtual assistant feature facilitates interaction with the various annotations of the second recorded video as further explained below. Specifically, all of the features described below may be performed in response to receiving one or more prompts via the virtual assistance feature. Receiving one or more prompts via the virtual assistance feature include, for example, receiving any of the above-noted questions or other prompts received by the virtual assistant feature.

The method 400 includes receiving, using the portable communications device 120, the second recorded video from the server 110 (at block 435). The second recorded video may be receiving in response to receiving and processing a prompt requesting inspection instructions for a particular cargo. For example, the second recorded video may be receiving in response to a user prompt of "access video for cargo." The second recorded video may be downloaded from the server 110 in response to the user prompt. The second recorded video is transferred by the server 110 using the transceiver 230 and received by the portable communications device 120 via the device transceiver 330. In some examples, the second recorded video may be automatically received in response to the user of the portable communications device 120 being assigned to manually inspect the cargo. Receiving the second recorded video may include receiving the image/video data, the audio data, and the metadata relating to the annotations of the second recorded video, for example, in a single file. The first recorded video may be captured by a portable communications device 120 (for example, a second portable communications device 120) that is different from the portable communications device 120 (for example, a first portable communications device 120) receiving the second recorded video from the server 110.

The method 400 includes generating, using the device electronic processor 310, an interactive display for displaying the second recorded video (at block 440). The interactive display may be generated on a graphical user interface (GUI) (for example, device input/output interface 340) of the portable communications device 120. The interactive display allows for interaction with the second recorded video, for example, with the annotations of the second recorded video. The interactive display may be generated alongside the virtual assistant feature such that the interactions may be performed using the virtual assistant feature. In some examples, the virtual assistant feature may generate the interactive display for the second recorded video. The interactive display may be generated in response to a user prompt, for example, "open the related cargo video."

The method 400 includes detecting, using the device electronic processor 310, an interaction with the annotations of the second recorded video (at block 445). The interactions may occur through selection, for example, a user clicking on an annotation or touching an annotation on a touch screen. In some examples, the interactions may occur through voice prompts relating to the second recorded video.

The method 400 includes providing, using the virtual assistant feature, a recommendation corresponding to the interaction (at block 450). As discussed above, the interaction may include selecting an annotation of the second recorded video. In response to the selection, the virtual assistant feature may provide recommendation relating to the manual inspection via a user interface (for example, via a human machine interface, via the device input/output interface 340, or the like). For example, in response to selecting a first annotation, the virtual assistant feature may announce (over a speaker or headphones of the portable communications device 120) what to look for, what kind of inspection to perform, what trends are being observed with respect to the cargo, what percentage of cargo to inspect, and/or the like. In some examples, the recommendation may be displayed as a text, an image, another video, instructions for an action, or the like on a display of the portable communications device 120. In some examples, the recommendations include voice prompts instructing for areas to check that may not have been inspected or missed by the CBP Officer. For example, the recommendation may include a voice prompt: "Have you opened the boot to perform a check?" In one example, the recommendation flags items that are mismatched and need further investigation. For example, the server 110 may identify a mismatch between the model of car expected to be associated with a VIN and the model of car including the VIN. One example interaction between the virtual assistant feature and a CBP Officer is as follows. Virtual Assistant: "Officer this is a Mercedes Benz 2020, here are the key inspection points that I checked already and the ones that need your help, do you need instructions for any of the points?" Officer: "Where is the VIN for this car?" Virtual Assistant: "Under the windshield glass on the passenger side. This came from Germany therefore number should be 20 digits and start with '325456'. Please check that it doesn't look like a sticker, it should be part of the vehicle."

In one example, the recommendation includes a task assignment of inspection to identified CBP Officers having predetermined experience with inspection of a cargo type of the second subset of the cargo. CBP Officers may have expertise in certain types of cargo based on their education, work experience, or other factors. The virtual assistant feature may identify the CBP Officers with relevant expertise and assign the task of manual inspection to the identified CBP Officers. In one example, the recommendation includes instructions to capture another image/video of the cargo. For example, the recommendation may include an automated user interface for aligning and automatically capturing a high-resolution image of the second subset of cargo. The automated user interface may be displayed on the portable communications device 120 and may instruct the user on how to capture the high-resolution image. In one example, the high-resolution image is received as inspection feedback response for the interaction of block 445. This inspection feedback response may be used to subsequently generate refined camera alignment recommendation for cargo types similar to the second subset of cargo based on the high-resolution image.

In some examples, the recommendation may include instructions coordinating the inspection tasks among multiple CBP Officers. The recommendation may also include percentage of boxes within the cargo to inspect, hidden areas where illegal items may be stored, announcing current progress of inspection, or the like.

In some examples, the portable communications device 120 may receive inspection feedback response (for example, first inspection feedback response) for the interaction. For example, the CBP Officer may provide results or observations from the manual inspection. The inspection feedback may be dictated to the virtual assistant feature, which may summarize the inspection feedback. The portable communications device 120 may send the inspection feedback to the server 110. The server 110 stores the inspection feedback response as a risk factor corresponding to the information corresponding to the cargo. Subsequent risk assessments as discussed above may be further performed based on the risk factor associated with the type of product, for example, type of children's toy. In one example, the inspect feedback response may include the CBP Officer capturing an image of a counterfeit item and uploads the image to the server 110. This image may be later referenced by a second CBP Officer in the second CBP Officer's inspection of a similar item.

In some examples, the first inspection feedback response as discussed above is received at a first regional entry point for a particular cargo type. For example, A children's toy (for example, a type of cargo) may be manually inspected by a first CBP Officer at regional entry point A (for example, first regional entry point). First inspection feedback response regarding the children's toy may be received noting that the type of the inspected children's toy included a banned chemical. A second inspection feedback response may be received for the same cargo type at a second regional entry point. For example, a similar children's toy may be manually inspected by a second CBP Officer at regional entry point B (for example, second regional entry point). Second inspection feedback response regarding the children's toy may be received noting that the type of inspected children's toy is a counterfeit. The first inspection feedback response and the second inspection feedback response are cross-correlated for the cargo type (that is, the children's toy) across the various regional entry points. In some examples, inspection feedback response from multiple CBP regional entry points is cross-correlated and stored with respect to the cargo type, the origin, the destination, or the like (for example, a factor relating to the cargo). The cross-correlation may be stored in, for example, a relational database, a blockchain, or the like that relates the inspection feedback response to the factor relating to the cargo (for example, the cargo type, the origin, the destination, or the like). This stored cross-correlation may be used for future automatic inspection and/or to highlight areas for manual inspection. For example, a subsequent recommendation (for example, updated recommendation) for the cargo type may be generated based on the first inspection feedback response and the second inspection feedback response.

In some examples, the communication system 100 can also translate documents or labels associated with cargo for inspection. The documents and labels associated with cargo may be in various languages depending on the origin of the cargo. The server electronic processor 210 may translate texts on the documents and labels into a preferred language selected by a CBP officer. The portable communications device 120 assigned to the CBP officer receives a selection of a first language as a preferred language, for example, on a graphical user interface of the portable communications device 120. The portable communications device 120 transmits the preferred language to the server 110. The server electronic processor 210 receives, from the portable communications device 120, an input specifying the first language as the preferred language. The input is, for example, the transmitted information that the first language is selected as the preferred language. The server electronic processor 210 recognizes a text in a second language in the first recorded video. The text is, for example, found in the documents or labels associated with the cargo. The server electronic processor 210 may use known optical character recognition techniques to recognize the text in the second language. The server electronic processor 210 translates the text from the second language to the first language to generate a translated text. Any machine translation technique, for example, based on commonly available online machine translators may be used to translate the text from the second language to the first language. In some embodiments, a pre-trained translation module may be used to translate the text. The translated text is provided as an annotation in the second recorded video, for example, as a comment associated with a document or label that can be seen in the second recorded video.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for cargo inspection, the method comprising:
receiving, at a server electronic processor, first recorded video associated with cargo at a cargo entry point;
performing, using the server electronic processor, video analytics on the first recorded video to identify information corresponding to the cargo;
automatically inspecting, using the server electronic processor, a first subset of the cargo based on the information corresponding to the cargo;
identifying, using the server electronic processor, a second subset of the cargo for manual inspection based on the information corresponding to the cargo;
generating, using the server electronic processor, a second recorded video by annotating the first recorded video, the second recorded video including annotations for the second subset of the cargo, the annotations provided on a portion of a frame of the second recorded video; and
accessing, using a portable communications device communicatively coupled to the server electronic processor, a virtual assistant feature of the portable communications device, and in response to receiving one or more prompts via the virtual assistant feature
receiving, using the portable communications device, the second recorded video from the server electronic processor;
generating, using a device electronic processor of the portable communications device, an interactive display for displaying the second recorded video;
detecting, using the device electronic processor, a user interaction with the annotations of the second recorded video; and
providing, using the virtual assistant feature, a recommendation corresponding to the interaction.

2. The method of claim 1, further comprising:
performing, using the server electronic processor, a risk assessment of the cargo based on the information corresponding to the cargo, the risk assessment being performed based on applying risk factors to the information corresponding to the cargo; and
assigning, using the server electronic processor, a risk score for each of the cargo based on the risk assessment, wherein the second subset of the cargo is identified based on the risk score of each of the cargo.

3. The method of claim 2, wherein the risk factors include one or more selected from the group consisting of cargo type, cargo documentation accuracy, source of cargo, historical data relating to cargo, agent experience, agent expertise, and location of entry point.

4. The method of claim 2, further comprising:
receiving, using the portable communications device, inspection feedback response for the interaction; and
storing the inspection feedback response as a risk factor corresponding to the information corresponding to the cargo, wherein subsequent risk assessments are further performed based on the risk factor.

5. The method of claim 4, wherein the inspection feedback response is a first inspection feedback response received at a first regional entry point for a cargo type, the method further comprising:
receiving second inspection feedback response for the cargo type at a second regional entry point;
cross-correlating the first inspection feedback response and the second inspection feedback response for the cargo type; and
generating an updated recommendation for the cargo type.

6. The method of claim 1, wherein the recommendation includes a task assignment of inspection to identified personnel having predetermined experience with inspection of a cargo type of the second subset of the cargo.

7. The method of claim 1, wherein the portable communications device is a first portable communications device, and wherein the first recorded video is captured by a second portable communications device different from the first portable communications device.

8. The method of claim 1, wherein the recommendation includes an automated user interface for aligning and automatically capturing a high-resolution image of the second subset of the cargo.

9. The method of claim 8, further comprising:

receiving the high-resolution image as inspection feedback response for the interaction; and generating refined camera alignment recommendations for cargo types similar to the second subset based on the high-resolution image.

10. The method of claim 1, further comprising:

receiving, from the portable communications device, an input specifying a first language as a preferred language;

recognizing, using the server electronic processor, a text in a second language in the first recorded video; and translating, using the server electronic processor, the text from the second language to the first language to generate a translated text, wherein the translated text is included as an annotation in the second recorded video.

11. A communication system for cargo inspection, comprising:

a server including an electronic processor configured to receive a first recorded video associated with cargo at a cargo entry point, perform video analytics on the first recorded video to identify information corresponding to the cargo, automatically inspect a first subset of the cargo based on the information corresponding to the cargo, identify a second subset of the cargo for manual inspection based on the information corresponding to the cargo, generate a second recorded video by annotating the first recorded video, the second recorded video including annotations for the second subset of the cargo, the annotations provided on a portion of a frame of the second recorded video; and a portable communications device communicatively coupled to the server and including a device electronic processor configured to access a virtual assistant feature of the portable communications device, and in response to receiving one or more prompts via the virtual assistant feature, the device electronic processor is configured to receive the second recorded video from the server, generate an interactive display for displaying the second recorded video, detect a user interaction with the annotations of the second recorded video, and provide, using the virtual assistant feature, a recommendation corresponding to the interaction.

12. The communication system of claim 11, wherein the electronic processor is further configured to perform a risk assessment of the cargo based on the information corresponding to the cargo, the risk assessment being performed based on applying risk factors to the information corresponding to the cargo; and assign a risk score for each of the cargo based on the risk assessment, wherein the second subset of the cargo is identified based on the risk score of each of the cargo.

13. The communication system of claim 12, wherein the risk factors include one or more selected from the group consisting of cargo type, cargo documentation accuracy, source of cargo, historical data relating to cargo, agent experience, agent expertise, and location of entry point.

14. The communication system of claim 12, wherein the electronic processor is further configured to receive, from the portable communications device, inspection feedback response for the interaction; and store the inspection feedback response as a risk factor corresponding to the information corresponding to the cargo, wherein subsequent risk assessments are further performed based on the risk factor.

15. The communication system of claim 14, wherein the inspection feedback response is a first inspection feedback response received at a first regional entry point for a cargo type, the electronic processor is further configured to receive second inspection feedback response for the cargo type at a second-regional entry point;

cross-correlate the first inspection feedback response and the second inspection feedback response for the cargo type; and generate an updated recommendation for the cargo type.

16. The communication system of claim 11, wherein the recommendation includes a task assignment of inspection to identified personnel having predetermined experience with inspection of a cargo type of the second subset of the cargo.

17. The communication system of claim 11, wherein the portable communications device is a first portable communications device, and wherein the first recorded video is captured by a second portable communications device different from the first portable communications device.

18. The communication system of claim 11, wherein the recommendation includes an automated user interface for aligning and automatically capturing a high-resolution image of the second subset of the cargo.

19. The communication system of claim 18, wherein the electronic processor is further configured to receive the high-resolution image as inspection feedback response for the interaction; and generate refined camera alignment recommendations for cargo types similar to the second subset based on the high-resolution image.

20. The communication system of claim 11, wherein the electronic processor is further configured to receive, from the portable communications device, an input specifying a first language as a preferred language;

recognize a text in a second language in the first recorded video; and translate the text from the second language to the first language to generate a translated text, wherein the translated text is included as an annotation in the second recorded video.

* * * * *